United States Patent [19]
Hoffschmidt et al.

[11] Patent Number: 5,979,439
[45] Date of Patent: Nov. 9, 1999

[54] SOLAR RECEIVER

[75] Inventors: Bernhard Hoffschmidt, Bergisch Gladbach; Robert Pitz-Paal, Troisdorf, both of Germany

[73] Assignee: Deutsches Zentrum fuer Luft- und Raumfahrt e.V., Bonn, Germany

[21] Appl. No.: 09/161,450

[22] Filed: Sep. 28, 1998

[30] Foreign Application Priority Data

Oct. 1, 1997 [DE] Germany ............................ 197 43 428

[51] Int. Cl.$^6$ .................................................... F24J 2/10
[52] U.S. Cl. .......................................... 126/693; 126/650
[58] Field of Search .................................... 126/648, 650, 126/692, 693, 694, 695

[56] References Cited

U.S. PATENT DOCUMENTS 4,343,298  8/1982  Ambille et al. ........................ 126/692

Primary Examiner—Carroll Dority
Attorney, Agent, or Firm—Diller, Ramik & Wight, PC

[57] ABSTRACT

A solar receiver (10; 110) for a solar thermal power plant comprises an elongated supply chamber (16; 118) for a heat carrier medium flowing in the supply chamber (16; 118) at a small loss of pressure, an elongated absorber (13; 113), the inlet areas (21; 119) thereof extending in a longitudinal direction and limiting the supply chamber (16; 118), and a drain chamber (18; 125) extending in a longitudinal direction and being contained in the supply chamber (16; 118) for the heated heat carrier medium and being limited by at least one outlet area (22; 124) extending in a longitudinal direction, the inlet area (21; 119) and the outlet area (22; 124) being offset against each other in a transverse direction. This is why the heat carrier medium flows in a transverse direction to the absorber (13; 113) so that the flow causing a loss of pressure is limited on a relatively short path and the heat carrier medium being heated flows towards the increasing intensity of incident radiation.

12 Claims, 4 Drawing Sheets

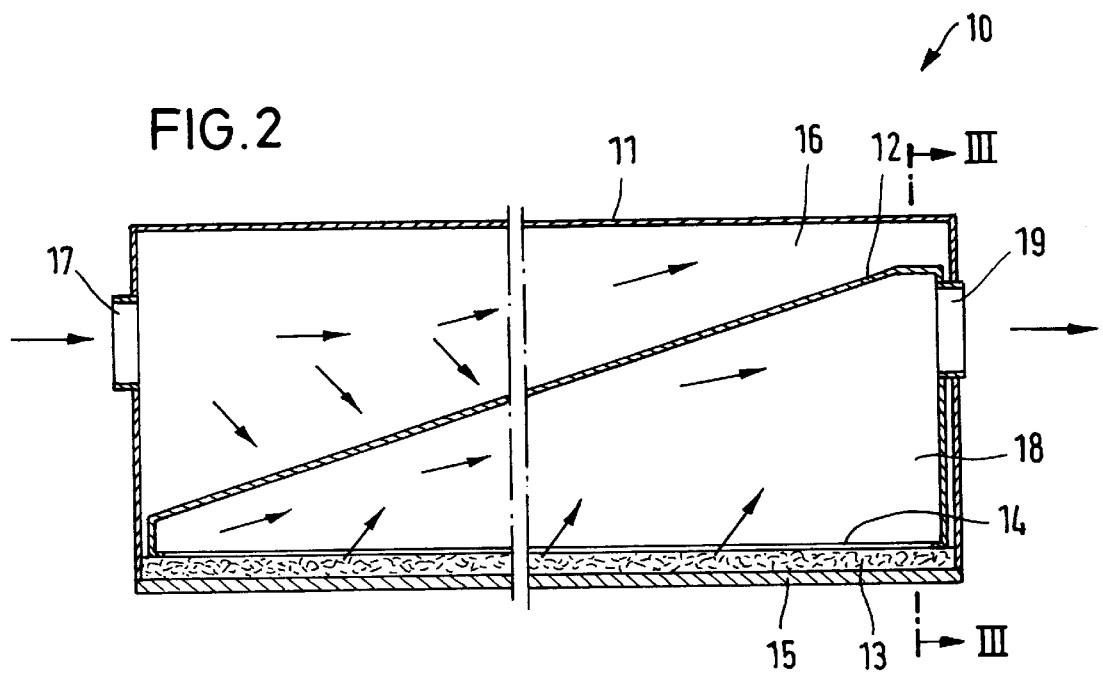
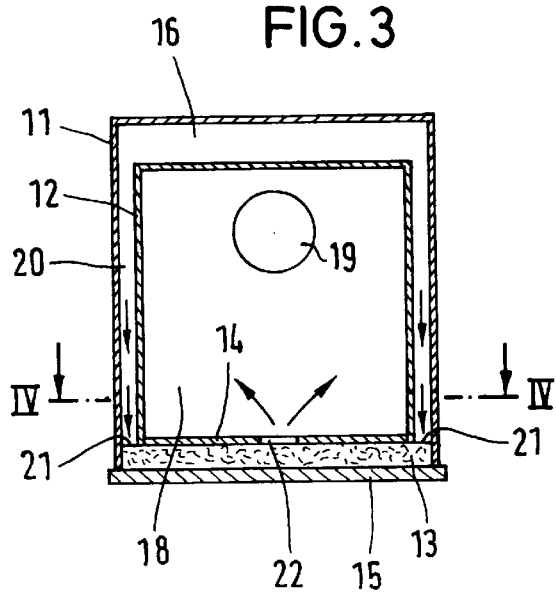 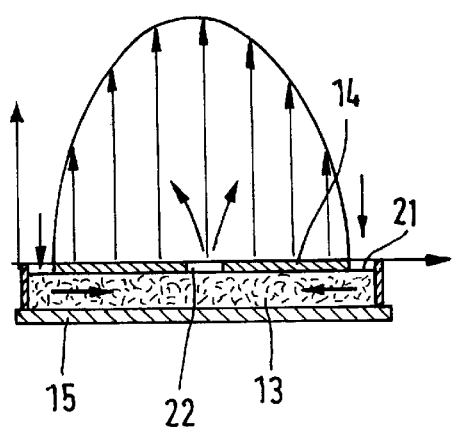

SOLAR RECEIVER

BACKGROUND OF THE INVENTION

The invention relates to a solar receiver for a solar thermal power plant having trough-shaped concentrators for focusing incident solar radiation onto a solar receiver.

In solar thermal power plants, the incident solar radiation is amplified multiple times by being focused by concentrators onto a solar receiver absorbing the concentrated solar radiation and releasing it to a heat carrier medium, such as air or water. The heated heat carrier medium is then put to use, for example by being provided to a turbine for driving a generator.

In solar thermal power plants having trough-shaped concentrators, the solar receiver usually is tubular and arranged concentrically to the concentrator, which is mostly provided in the shape of a parabolic trough. The solar receiver can be formed either as a directly absorbing receiver in which a colored water carrier medium flows through the receiver tube allowing the solar radiation to pass therethrough, which medium then directly absorbs the incident solar radiation, or be formed as a volumetric receiver in which a porous absorber is arranged in the interior of the receiver tube and absorbs the incident solar radiation, the heat carrier medium flowing therethrough and being heated convectively. Usually, liquid media, such as water or thermal oil, are used as the heat carrier medium.

U.S. Pat. No. 4,446,851 describes a surface concentrator comprising multiple supply and drain chambers extending longitudinally, being arranged next to one another and being connected to an absorber arranged above the chambers. The heat carrier medium flows through the absorber in a transverse direction, i.e. from a supply chamber to a drain chamber. In the chambers, the heat carrier medium flows in a longitudinal direction. This solar receiver is not adapted to be employed in a trough concentrator, as it comprises too large an area to be arranged in the small concentration area of a trough concentrator. Additionally, the construction of the solar concentrator requires the use of an insulation material which has to be heated whenever the solar thermal power plant starts operating. Especially in the case of trough concentrators where a relatively small concentration factor is obtained, this leads to a noticeable deterioration of efficiency.

In the case of elongated solar receivers for trough concentrators, the heat carrier medium flows through the porous absorber in the longitudinal direction; thus, it has to be transported through the entire length of the absorber. In the case of the usually cylindrical solar receivers, it is an objective to select the cross section thereof to be as small as possible to minimize the surface and thus the loss by dissipation. However, this leads to an increase in the speed of the heat carrier medium resulting in an increased loss of pressure of the heat carrier medium, as the loss of pressure within a porous absorber increases quadratically to the speed of the heat carrier medium. To counteract this loss of pressure, energy for compressing the heat carrier medium has to be employed, which reduces the efficiency of the installation. In the case of usual solar receivers of this kind, a less than optimum compromise has to be achieved between the size of the tube, which should be as large as possible in the area of the incidence of radiation for receiving the radiation, and as small as possible in the area opposite the radiation for reducing the loss due to emission, and the speed of the flow the loss of pressure depends on.

For the pressure not to decrease too far, the heat carrier medium is introduced into the absorber at a high pressure of up to 30 bars. The operation of such installations has shown that occasional leaks cannot be avoided. This led to a number of security and environmental requirements which can makes the construction of such an installation considerably more expensive.

SUMMARY OF THE INVENTION

It is the object of the invention to provide a solar receiver for a trough concentrator having a simple construction and a high efficiency with little loss of pressure of the heat carrier medium within the solar receiver.

The invention provides a solar receiver for a trough concentrator of a solar thermal power plant, having an elongated porous absorber for guiding through a heat carrier medium, the absorber comprising a frontal surface working as a receiver surface the solar radiation focused by the trough concentrator impinges on, characterized in that a supply chamber for the heat carrier medium is limited by at least one inlet area, extending longitudinally, of the absorber, that a drain chamber for the heated heat carrier medium is limited by at least one outlet area, also extending longitudinally, of the absorber, the inlet area and the outlet area being offset against each other in a transverse direction so that a transverse flow extending transversely to the incident radiation is produced in the absorber, and that the drain chamber is contained in the supply chamber.

The solar receiver according to the invention has an elongated supply chamber for the heat carrier medium being limited by at least one longitudinally arranged inlet area of a porous absorber being heated by incident solar radiation and releasing the heat to the heat carrier medium flowing therethrough. Furthermore, a drain chamber for the heated heat carrier medium is provided being arranged in the supply chamber and being limited by at least one longitudinally extending outlet area of the absorber. The inlet area and the outlet area are offset against each other in the transverse direction. Due to this construction, the heat carrier medium flows transversely through the absorber body, i.e. only for a very short distance compared to the longitudinal direction, so that the losses of pressure occurring in the absorber body of the heat carrier medium are reduced considerably. This effect is even increased when the drain chamber and the supply chamber are designed to have a large volume so that the heat carrier medium flows slowly in the chambers, which occurs without any significant loss of pressure. Thus, only a small loss of pressure occurs across the solar receiver, which allows the heat carrier medium, preferably air, to be used at a small high pressure or at ambient pressure.

Another advantage of the transverse flow of the heat carrier medium in the absorber is that the heat carrier medium is heated in the parallel direction to the radiation gradient of the incident solar radiation, i.e. that the heat carrier medium is subject to an increasingly higher intensity of incident radiation. Due to the construction of the concentrators, the radiation intensity in the transverse direction is highest in the center of the receiver surface while it is reduced towards the marginal areas of the absorber. The inlet area is advantageously located on the edge of the absorber, as seen in the transverse direction, so that the as yet cool heat carrier medium is heated by solar radiation of low intensity. If the outlet area seen in the transverse direction is located in the center of the absorber, the heated heat carrier medium leaves the absorber in the area of the highest intensity of incident radiation. That way, the heat carrier medium can be heated in a thermodynamically beneficial manner, as a sufficient difference is present, at each point of the absorber, between the temperature of the heat carrier medium and the temperature of the absorber, which is proportional to the intensity of incident radiation, so that the heat carrier medium can continuously receive the heat of the absorber.

As the supply chamber surrounds the drain chamber, the radiation losses of the drain chamber heated by the hot heat carrier medium are received by the as yet cold heat carrier medium flowing through the supply chamber so that this energy is not lost to the process. This construction allows for abandoning an insulation material for the drain chamber which is expensive, on the one hand, and reduces the efficiency of the installation, on the other hand, as the insulation material has to be heated whenever the installation starts operating, i.e. daily in the case of a solar thermal power plant. By means of this construction, it is possible to adapt the receiver surface of the absorber to the respective conditions of the concentrators without disadvantages appearing during the operation of the solar receiver, as the radiation losses in the area opposite the incident radiation of the solar receiver are provided back to the system and as no substantial losses of pressure occur within the solar receiver.

Furthermore, it is advantageous that the construction of the solar receiver is very simple so that a simple steel sheet design can be used. That is why the solar receiver is especially suited for small-scale applications with an output of less than 10 kW.

Special designs of the solar receivers are disclosed in the subclaims and the figures together with the description thereof.

BRIEF DESCRIPTION OF THE DRAWINGS

Embodiments of the invention will now be described in greater detail with reference to the drawings.

FIG. 2 shows a longitudinal section through a first exemplary embodiment of the solar receiver, FIG. 3 shows a sectional representation of the solar receiver according to line III—III of FIG. 2, FIG. 7 shows a cross section through the absorber together with the distribution of the intensity of incident radiation.

DESCRIPTION OF THE PREFERRED EMBODIMENTS

Figure 1:
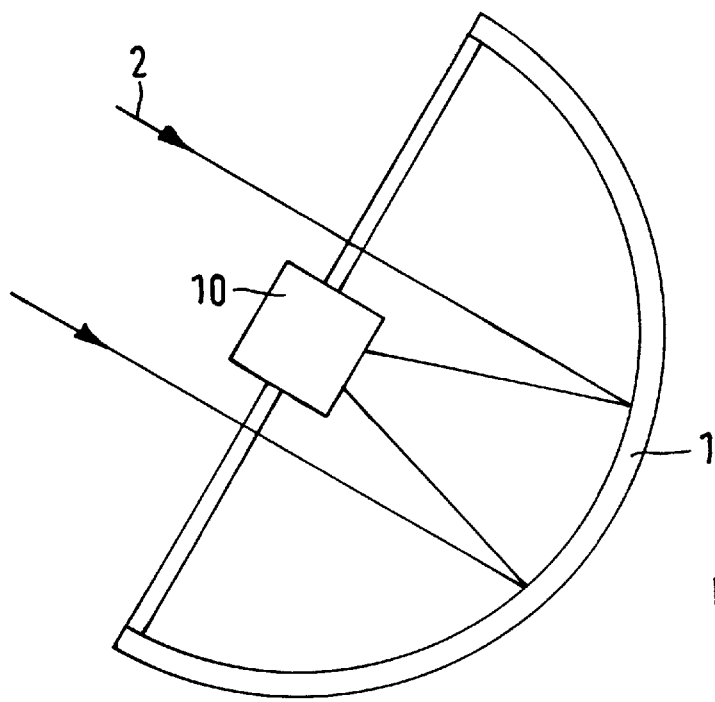
FIG. 1 shows the construction principle of a solar concentrator having a solar receiver.

FIG. 1 shows a trough concentrator 1 of a solar thermal power plant. The trough concentrator 1 comprises a parabolic cross section so that incident solar radiation 2 is concentrated onto a focal line. A solar receiver 10 is arranged such as to surround the focal line. The trough concentrator 1 tracks the sun on a single axis such that the same conditions of incident radiation are always present on the solar receiver 10.

Figure 4:
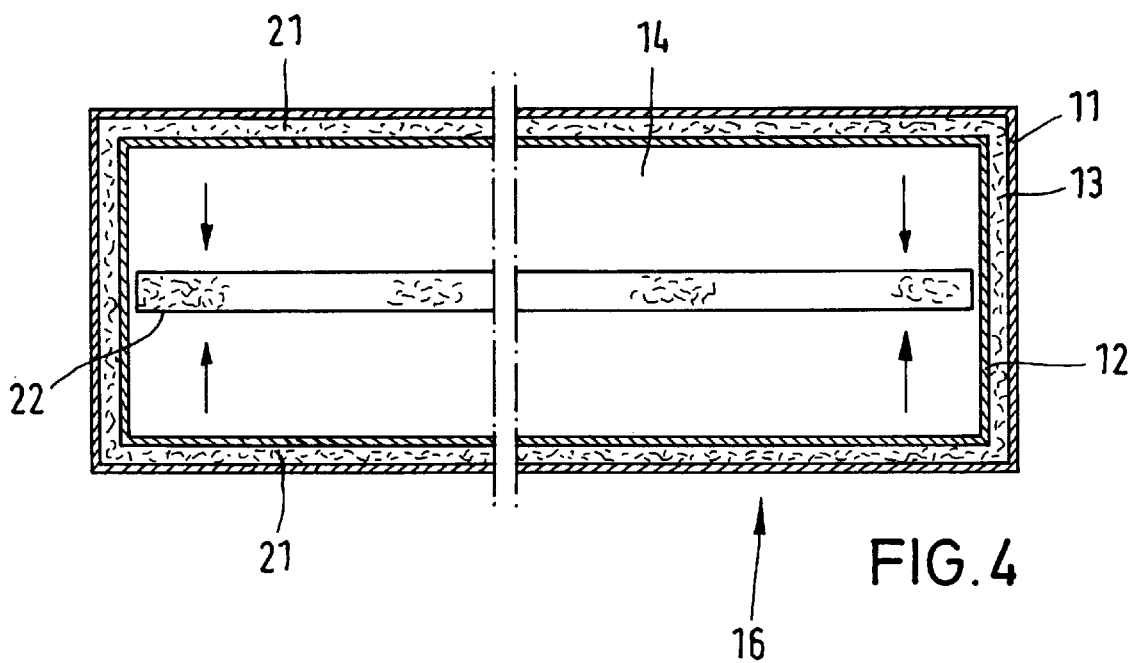
FIG. 4 shows a sectional representation of the solar receiver according to line IV—IV of FIG. 3.

The solar receiver 10 according to a first exemplary embodiment will now be described in greater detail with reference to FIGS. 2–4. The solar receiver 10 comprises an elongated rectangular exterior box 11 of steel sheet material which is open on a frontal longitudinal upper side. An interior box 12 also consisting of steel sheet material is inserted in the exterior box 11. The bottom wall of the interior box 12 located in the exterior box 11 is chamfered, while the opposite upper side is open.

The opening of the exterior box 11 is enclosed by a porous absorber 13. The interior box 12 is applied to the interior side of the absorber 13 directed towards the interior space of the exterior box 11. In the area of the interior box 12, the interior side of the absorber 13 is covered by a plate 14, the plate 14 being connected sealingly to the interior box 12. In the central area thereof, the plate 14 can comprise multiple holes arranged next to one another in the longitudinal and/or transverse direction so that a perforated plate is formed. The perforated plate has the character of an aperture and provides a defined loss of pressure. The exterior side of the absorber 13 is covered by a heat-resistant cover 15 transparent to solar radiation and consisting, e.g., of fused quartz. The cover 15 is connected sealingly to the exterior box 11.

On the rear side of the exterior box 11, a supply chamber 16 essentially triangular in cross section is formed by the exterior box 11 and the interior box 12 for the heat carrier medium. The heat carrier medium, for example air, can be fed to the supply chamber 16 through a supply opening 17 provided in the face side of the exterior box 11. The interior box 12 and the plate 14 limit a drain chamber 18 for the heated air which can be guided out of the solar receiver 10 through a drain opening 19 provided in the second face side of the exterior box 11.

The interior box 12 is dimensioned and arranged within the exterior box 11 such as to form a gap 20 surrounding the interior box 12 (FIG. 3). The gap 20 verges into two inlet areas 21 of the absorber, which extend in the longitudinal direction thereof and are located on the interior side of the absorber 13 (FIG. 4). The longitudinal gap of the plate 14 forms the outlet area 22 of the absorber 13. The plate 14 can also comprise other opening patterns for setting other flow conditions.

In the case of a construction as an open system, cold ambient air is introduced through the supply opening 17, or, in the case of a construction as a closed system, recycled air from the consumer is introduced for operating the solar receiver 10. The air is either pressed into the supply opening 17 or drawn off through the drain opening 19 (in the direction of the arrows).

Due to the relatively large dimensions of the supply chamber 16, the air moves slowly in the supply chamber 16 so that only a small loss of pressure occurs. The air spreads generally linearly in the supply chamber 16 and rises up the bevel formed by the exterior wall of the interior box 12. As the only path out of the supply chamber passes through the absorber 13, the air flows through the gap 20, which extends laterally in the cross section thereof (FIG. 3), to the inlet areas 21. In this process, the air flows past the interior box 12 heated by the hot air and is preheated by the radiated heat. In the collector 13, the air flows transversely to the longitudinal direction of the solar receiver 10.

Figure 6:
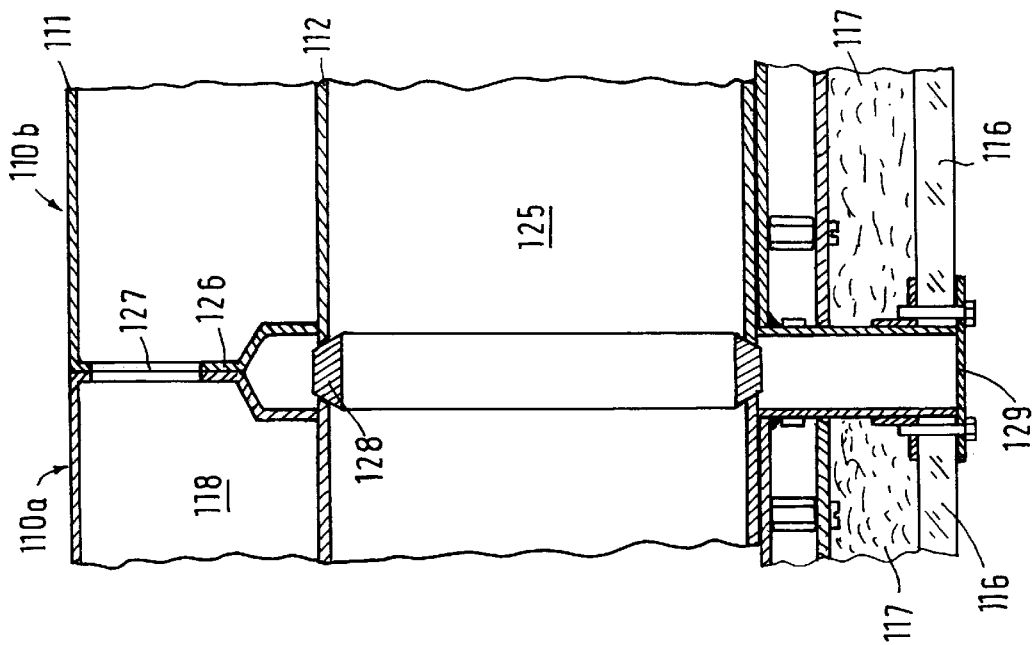
FIG. 6 shows a longitudinal section through the second embodiment of the solar receiver.
Figure 5:
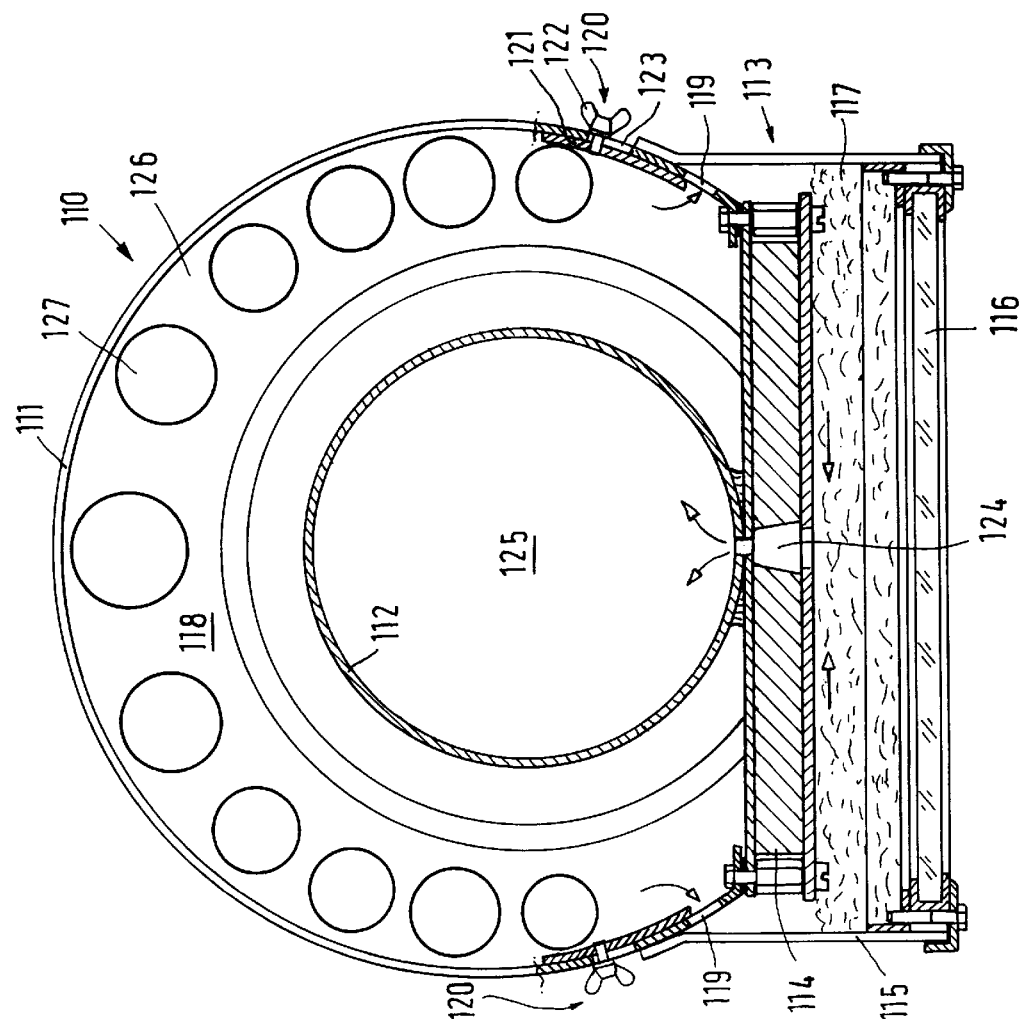
FIG. 5 shows a face view of a second embodiment of the solar receiver.
Figure 8A:
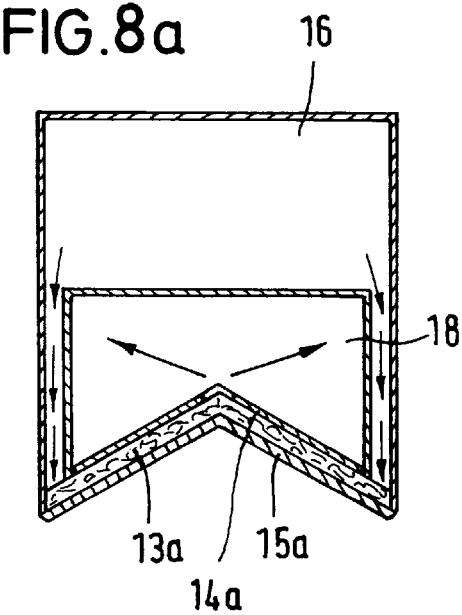
FIGS. 8a–8d show various embodiments of the receiver surfaces of the absorber.
Figure 8B:
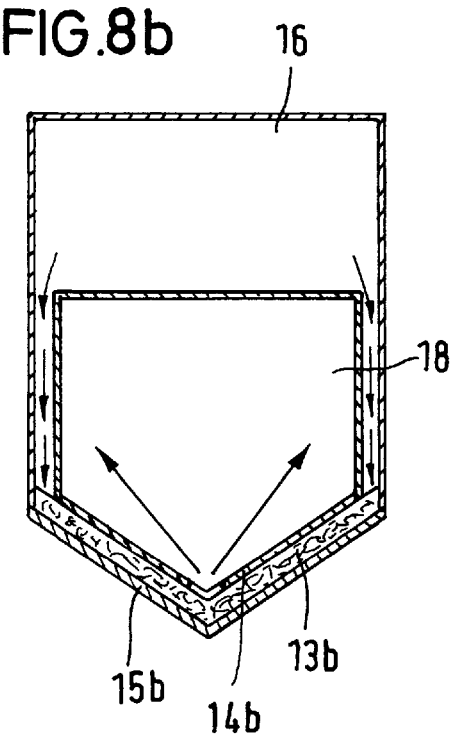
Figure 8C:
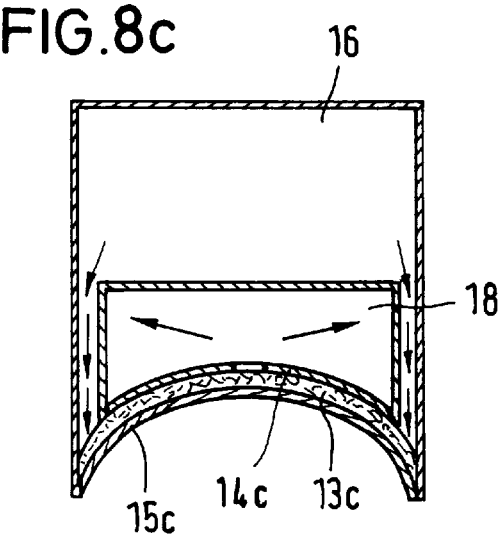
Figure 8D:
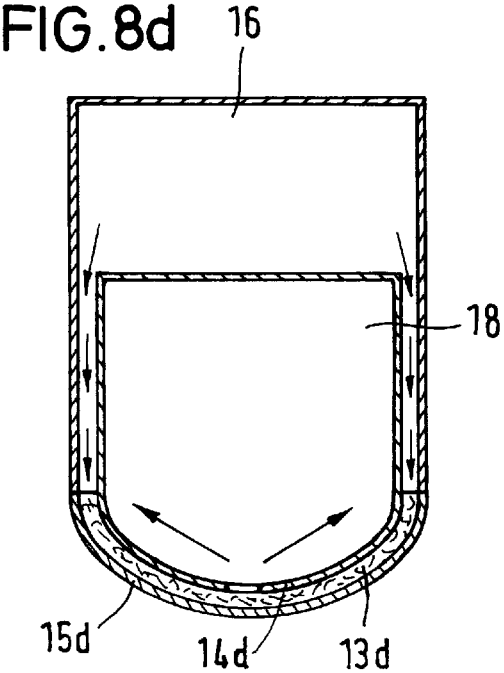

A solar receiver 110 according to a second exemplary embodiment of the invention is shown in FIGS. 5 and 6. The solar receiver 110 comprises an elongated exterior tube 111 of steel sheet material comprising a longitudinal opening on a frontal face. An interior tube 112 is located in the exterior tube 111.

The opening of the exterior tube 111 is closed by an absorber 113. The absorber 113 has a plane plate arrangement 114 which is screwed on the edges of the opening of the exterior tube 111 and which supports, in the central area, the interior tube 112, which may be welded there, for example. The plate arrangement 114 is arranged like a secant to the exterior tube 111 and forms a tangent to the interior tube 112, which means that the longitudinal axes of the two tubes 111, 112 do not coincide. The plate arrangement 114 consists of two steel sheets on top of each other with an insulation material arranged therebetween. The insulation material is optional and serves to isolate the absorber 113 from the heat carrier medium flowing through the tubes 111, 112.

In the frontal area, a supporting structure 115 is connected to the exterior side of the exterior tube 111, which engages around the opening of the exterior tube 111 and extends beyond the plate arrangement 114. The supporting structure 115 consists of two longitudinally extending sheets which are arranged transversely to the plate arrangement 114. A heat-resistant cover 116 transparent to solar radiation and consisting, for example, of fused quartz is arranged on the frontal ends of the sheets. The cover 116 is connected to the supporting structure 115 by means of clamping elements. The supporting structure 115 is arranged and dimensioned such that an intermediate space remains between the plate arrangement 114 and the cover 116 as well as the supporting structure 115. The intermediate space is filled with a porous absorber body 117 between the plate arrangement 114 and the cover 116, which absorber body is heated by the incident solar radiation impinging on the cover 116.

The exterior tube 111 and the interior tube 112 limit a supply chamber 118 into which the as yet cool heat carrier medium flows, the flow occurring in a longitudinal direction. An inlet area 119 for the absorber 113 is arranged between the edges of the opening of the exterior tube 111 and the point of fixture of the supporting structure 115 on the exterior tube 111. The two inlet areas 119 arranged to the left and right of the plate arrangement 114 consist of a plurality of holes arranged behind one another in a longitudinal direction. The holes function like an aperture and provide a defined loss of pressure, whereby the course of the flow of the heat carrier medium is adjustable.

To adapt the solar receiver 110 to different kinds of operation, such as changed conditions of incident radiation or an inclined operational state due to tracking of the trough concentrator, the size of the openings of the inlet areas 119 can be changed by an adjustment means 120. The adjustment means 120 consists of an aperture 121 bearing against and being displaceable along the interior wall of the exterior tube 111 so that the opening is more or less covered. The aperture 121 is supported by a wing bolt 122 guided in a longitudinal gap 123 of the exterior tube 111. The wing bolt 122 to be operated manually can of course be replaced by an automatic operational means such as a motor controlled by a central computer.

The heat carrier medium gets through the inlet areas 119 past the exterior edges of the plate arrangement 114 into the absorber body 117. There it flows from the left and from the right in a transverse direction into the center of the absorber body 117. The heating process of the heat carrier medium in the absorber body 117 will be described later on with reference to FIG. 7.

In the central area of the plate arrangement 114, an outlet area 124 for the absorber 113 is provided. The outlet area 124 consists of multiple hole openings arranged behind one another in a longitudinal direction which extend through the entire plate arrangement 114 and through the wall of the interior tube 112 so that a connection between the absorber body 117 and the interior of the tube 112 is provided, where a drain chamber 125 for the now heated heat carrier medium is formed.

In the drain chamber 125, the heat carrier medium again flows in a longitudinal direction.

The interior tube 112 is supported fixedly on the plate arrangement 114 by means of the welding. To obtain a better stability, an aperture wall 126 is provided on each frontal side of the solar receiver 110, which wall extends between the interior wall of the exterior tube 111 and the exterior wall of the interior tube 112. The aperture wall 126 comprises flow openings 127 having a round cross section and being distributed across the surface of the aperture wall 126. The flow openings 127 connect the intermediate spaces between the exterior tube 111 and the interior tube 112 of two adjacent solar receivers 110a, 110b (FIG. 6) so that a continuous supply chamber 118 is formed. The flow openings 127 function as apertures and stabilize the flow of the heat carrier medium.

An annular clamping element 128 having a diameter roughly corresponding to the diameter of the interior tube 112 is provided to connect two solar receivers 110a, 110b in a longitudinal direction behind each other. The thickness of the wall of the clamping element 128 is greater, preferably twice to three times as great as the thickness of the wall of the interior tube 112. The frontal faces of the annular clamping element 128 are chamfered. In the process of joining two solar receivers 110a, 110b and before assembling, the clamping element 128 is brought between the two interior tubes 112 of the two solar receivers 110a, 110b. In pressing the two solar receivers 110a, 110b together, the interior tubes 112 are slid on the chamfer so that a seal is formed. That way, the two interior spaces of the tubes 112 of the two solar receivers 110a, 110b are connected to form a continuous drain chamber 125 for the hot heat carrier medium. To allow the clamping element 128 to be received, the aperture wall is recessed in the interior area thereof, i.e. at the transition to the interior tube 112 so that the two frontal walls 126 of the two solar receivers 110a, 110b do not abut. In the exterior area, i.e. where the flow openings 127 are formed, the aperture wall 126 is flush with the wall of the exterior tube 111 so that the two frontal walls 126 of the two solar receivers 110a, 110b flatly abut in this area.

In the area of the absorber 113, the two solar receivers 110a, 110b are connected to each other by means of a clamp 129. In the area of the exterior tube 111, the two solar receivers 110a, 110b are sealed and connected by means not represented. Stickings or weldings or clamps mounted on the exterior side of the exterior tubes 111 would be useful, for example.

The heating of the air in the absorber 13 or 113 will now be described in greater detail with reference to FIG. 7. In the following paragraphs, the reference numerals of the first embodiment are used for the sake of simplicity. However, what has been said there also applies, to the same extent, to the second exemplary embodiment. The solar radiation 2 focused by the trough concentrator 1 enters through the cover 15 into the absorber 13, heating it. The air flowing through the absorber 13 in the direction of the arrows is then heated convectively. This heating occurs in a thermodynamically beneficial manner, as the air flows towards the increasing intensity of the incident radiation so that the air is permanently guided past even hotter places of the absorber 13, whereby a difference in temperature sufficient for heating the air is always present between the air and the absorber 13. The hot air enters the drain chamber 18 through the outlet area 22, which is located in the place of maximum intensity of incident radiation.

The air entering across the entire length of the drain chamber 18 (FIG. 2) is heated uniformly, as the air has passed a similar heat profile, as seen in the transverse direction. In the drain chamber, the heated air flows relatively slowly due to the relatively large dimensions of the drain chamber 18, i.e. at a low loss of pressure towards the drain opening 19 through which it is fed to the consumer. After the hot air has been used and the air cooled off, it can be recycled to the solar receiver 10 and 110, respectively.

FIGS. 8a–8d show alternative embodiments of the absorber 13 or 113 and the cover 15 or 116, which form differently shaped receiver surfaces. The receiver surfaces of the absorbers 13a, 13b are triangular, while the receiver surfaces of the absorbers 13c, 13d are formed in the shape of a circle or a parabola. By the variation of the receiver surfaces, the solar receiver 10 or 110 can be adapted better to geometric conditions of solar concentrators, and reflection losses occurring on the cover 15 can be reduced.

The bottom wall of the exterior box 11 or the exterior tube 111 turned towards the directly incident solar radiation can be transparent to radiation so that the air in the supply chamber 16 is preheated by the directly incident solar radiation.

We claim:

1. Solar receiver for a trough concentrator of a solar thermal power plant, having an elongated porous absorber (13; 113) for guiding through a heat carrier medium, the absorber (13; 113) comprising a frontal surface working as a receiver surface the solar radiation focused by the trough concentrator (1) impinges on, characterized in that a supply chamber (16; 118) for the heat carrier medium is limited by at least one inlet area (21; 119), extending longitudinally, of the absorber (13; 113), that a drain chamber (18; 125) for the heated heat carrier medium is limited by at least one outlet area (22; 124), also extending longitudinally, of the absorber (13; 113) the inlet area (21; 119) and the outlet area (22; 124) being offset against each other in a transverse direction so that a transverse flow extending transversely to the incident radiation (2) is produced in the absorber (13; 113), and that the drain chamber (18; 125) is contained in the supply chamber (16; 118).

2. Solar receiver according to claim 1, wherein the inlet area (21) is arranged in at least one gap (20) between the supply chamber (16) and the drain chamber (18).

3. Solar receiver according to claim 1, wherein the surface, located between the inlet area (21; 119) and the outlet area (22; 124), of the absorber (13; 113) is provided with a cover (14; 114).

4. Solar receiver according to claim 1, wherein the inlet area (21; 119) and the outlet area (22; 124) are located in the rear surface of the absorber (13; 113).

5. Solar receiver according to claim 1, wherein the inlet area (21; 119) and/or the outlet area (22; 124) of the absorber (13; 113) comprise holes arranged behind one another in a longitudinal direction.

6. Solar receiver according to claim 1, wherein the front surface of the absorber (13; 113) is covered by a heat-resistant cover (15; 115) transparent to solar radiation (2).

7. Solar receiver according to claim 1, wherein the cross-sectional area of the supply chamber (16) decreases in the longitudinal direction and wherein the cross-sectional area of the drain chamber (18) increases in the longitudinal direction.

8. Solar receiver according to claim 7, wherein the cross-sectional area of the supply chamber (16) decreases to the same extent as the cross-sectional area of the drain chamber (18) increases.

9. Solar receiver according to claim 1, wherein the supply chamber (118) is limited by an exterior tube (111) and an interior tube (112) arranged therein and wherein the drain chamber (125) is limited by the interior tube (112).

10. Solar receiver according to claim 9, wherein both the tubes (111, 112) are fixed to the rear surface of the absorber (113).

11. Solar receiver according to claim 8, wherein at least one aperture wall (126) with flow openings (127) for the heat carrier medium is provided on a face side between the interior (112) and the exterior tubes (111).

12. Solar receiver according to claim 1, wherein the opening surface of the inlet area (119) and/or the outlet area (124) are changeable by means of an adjustment means.

* * * * *